United States Patent
Kobayashi et al.

(10) Patent No.: US 7,379,815 B2
(45) Date of Patent: May 27, 2008

(54) LANE DETECTION APPARATUS

(75) Inventors: Kenji Kobayashi, Kariya (JP); Yukimasa Tamatsu, Okazaki (JP)

(73) Assignee: Denso Corporation, Kariya (JP)

( * ) Notice: Subject to any disclaimer, the term of this patent is extended or adjusted under 35 U.S.C. 154(b) by 143 days.

(21) Appl. No.: 11/099,975

(22) Filed: Apr. 6, 2005

(65) Prior Publication Data

US 2005/0228587 A1 Oct. 13, 2005

(30) Foreign Application Priority Data

Apr. 9, 2004 (JP) ............................. 2004-115838

(51) Int. Cl.
*G05D 1/02* (2006.01)

(52) U.S. Cl. .................................... 701/300

(58) Field of Classification Search ................ 701/300, 701/70, 95, 96, 301; 382/103, 104, 106, 382/107, 154, 181, 190, 199, 201, 236, 256, 382/260; 342/454, 455; 180/167, 168, 169, 180/179; 356/27, 29
See application file for complete search history.

(56) References Cited

U.S. PATENT DOCUMENTS

| | | | |
|---|---|---|---|
| 5,483,453 A * | 1/1996 | Uemura et al. ............... 701/23 |
| 5,487,116 A | 1/1996 | Nakano et al. | |
| 6,091,833 A * | 7/2000 | Yasui et al. .................. 382/104 |
| 6,226,571 B1 * | 5/2001 | Kai ................................ 701/1 |
| 6,556,133 B2 * | 4/2003 | Ogura ......................... 340/435 |
| 6,580,385 B1 * | 6/2003 | Winner et al. ................. 342/70 |
| 6,753,902 B1 * | 6/2004 | Kashiwazaki ................ 348/119 |
| 6,819,779 B1 * | 11/2004 | Nichani ....................... 382/104 |
| 6,879,706 B2 * | 4/2005 | Satoh et al. ................. 382/104 |
| 2001/0010540 A1 | 8/2001 | Ogura et al. | |

FOREIGN PATENT DOCUMENTS

| | | |
|---|---|---|
| JP | 6-149360 | 5/1994 |
| JP | 7-306997 | 11/1995 |
| JP | 2003-063273 | 3/2003 |

* cited by examiner

*Primary Examiner*—Dalena Tran
(74) *Attorney, Agent, or Firm*—Harness, Dickey & Pierce, PLC

(57) ABSTRACT

A lane detection apparatus includes a capture means, a vehicle detection means, a subject lane detection means, and an additional lane detection means. The capture means captures an image around a subject vehicle. The vehicle detection means detects an object vehicle around the subject vehicle. The subject lane detection means detects a subject lane. The additional lane detection means detects an additional lane different from the subject lane based on a positional relationship between the object vehicle detected by the vehicle detection means and the subject lane detected by the subject lane detection means.

4 Claims, 4 Drawing Sheets

LANE DETECTION APPARATUS

CROSS REFERENCE TO RELATED APPLICATION

This application is based on and claims the benefit of priority of Japanese Patent Application No. 2004-115838 filed on Apr. 9, 2004, the disclosure of which is incorporated herein by reference.

FIELD OF THE INVENTION

The present invention relates to road lane detection and, more specifically, to a lane detection apparatus.

BACKGROUND OF THE INVENTION

In recent years, vehicle detection apparatuses for detecting a vehicle traveling in the same lane as a subject vehicle based on a captured image of a surrounding road have been developed. For example, U.S. Pat. No. 5,487,116 discloses a conventional vehicle detection apparatus that first extracts white boundary lines of a vehicular lane where the subject vehicle is traveling (a subject lane) from an image captured by a CCD camera to create an edge image by differential calculus processing for detecting lane width. The apparatus then determines if there is a preceding vehicle in the same lane as the subject vehicle by extrapolating image data based on the lane width of the subject lane.

However, as the vehicle detection apparatus described above uses a CCD captured image to determine the subject lane and an adjacent lane, it is impossible to detect an adjacent lane when the white boundary line between the subject lane and the adjacent lane is hidden by another vehicle. It is also a problem of the conventional lane detection apparatus that it cannot determine if the adjacent lane is an oncoming lane, a passing lane or the like. That is, a traveling direction of the adjacent lane cannot be detected by the conventional apparatus.

SUMMARY OF THE INVENTION

In view of the above problems, it is an object of the present invention to provide a lane detection apparatus that securely detects other lanes including an adjacent lane.

The lane detection apparatus of the present invention includes an image capture function for capturing an image of surroundings of a subject vehicle, a vehicle detection function for detecting another vehicle around the subject vehicle, a subject lane detection function for detecting a subject lane where the subject vehicle is traveling based on the image captured by the image capture function, and an additional lane detection function for detecting an additional lane based on a positional relationship between the other vehicle detected by the vehicle detection function and the subject lane detection by the subject lane detection function.

According to the present invention, the lane detection apparatus detects the additional lane beside the subject lane based on the positional relationship between the other vehicle and the subject lane. That is, the other vehicle is detected by the vehicle detection function provided by a device such as a millimetric wave radar, a laser radar or the like. The subject lane is detected based on the image captured by the image capture function provided by a device such as a camera or the like. Therefore, the additional lane can securely be detected without detecting a white boundary line of the additional lane or the like.

The lane detection apparatus also includes a search range setting function for setting a search range of the boundary line of the additional lane based on the width of the traveling lane, and a boundary line detection function for detecting the boundary line in the search range. The additional lane detection function detects the additional lane when the boundary line detection function cannot detect a boundary line of the additional lane.

In this manner, the lane detection apparatus detects the boundary line of the additional lane first, and it determines if there is an additional lane based on the positional relationship between the other vehicle and the subject lane only when the boundary line detection function does not or cannot detect the boundary line.

In the lane detection apparatus, the additional lane detection function detects the additional lane when the vehicle detection function detects the other vehicle and the other vehicle exists in a position outside of the subject lane. In this manner, the lane detection apparatus can detect an additional lane even when, for example, a white boundary line of the additional lane is hidden by the other vehicle.

In the lane detection apparatus, the vehicle detection function detects a distance and a relative velocity of the other vehicle with respect to the subject vehicle. The additional lane detection function determines a traveling direction of the additional lane based on the change of the distance and/or the relative velocity of the other vehicle.

The additional lane detection function determines that the traveling direction of the additional lane is the same as the subject lane when the distance to the other vehicle is decreasing and the relative velocity is smaller than the velocity of the subject vehicle. The function determines that the traveling direction of the additional lane is opposite to the subject lane when the distance to the other vehicle is decreasing and the relative velocity is greater than the velocity of the subject vehicle. The function determines that the traveling direction of the additional lane is the same as the subject lane when the distance to the other vehicle is increasing. In this manner, the traveling direction of the additional lane is determined based on the change of the distance to the other vehicle and/or the relative velocity of the other vehicle.

In the lane detection apparatus, the additional lane detection function detects the additional lane when the boundary line detection function detects a boundary line with the assistance of the search range setting function and the boundary line detection function. In this case, the apparatus detects the additional lane under a condition that the vehicle detection function does not detect another vehicle or the other vehicle is traveling in the same lane as the subject vehicle. In this manner, the additional lane is detected even when the other vehicle is not detected or when the other vehicle is traveling in the same lane as the subject vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

The lane detection apparatus of the present invention is described in a first embodiment as a part of a driving assistance apparatus that controls actuators in a drive train mechanism and a steering mechanism in an automotive vehicle.

Figure 1:
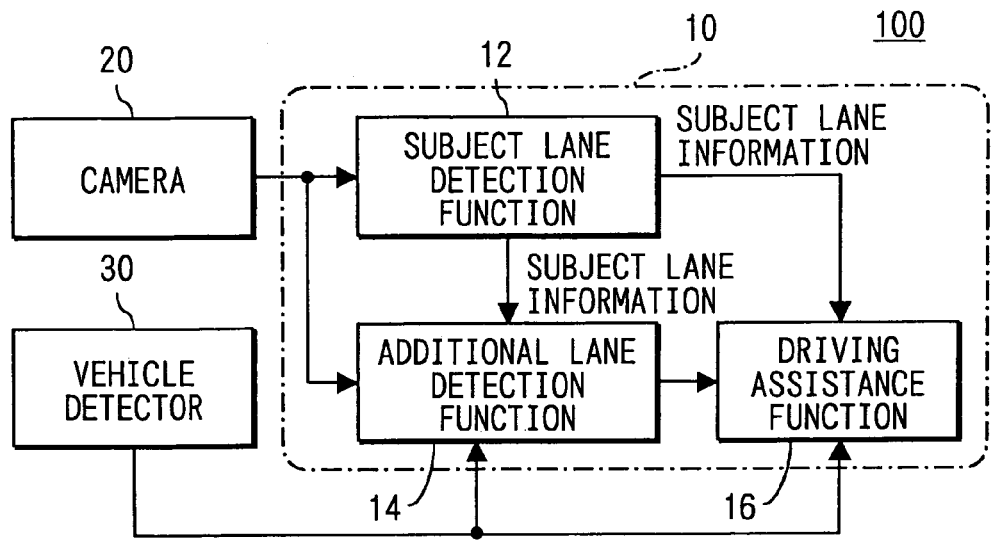
FIG. 1 is a block diagram of the lane detection apparatus according to a first embodiment of the present invention.

In FIG. 1, a lane detection apparatus 100 of a subject vehicle is shown in a block diagram. The device 100 includes a controller 10, a camera 20, and a vehicle detector 30.

Figure 3A:
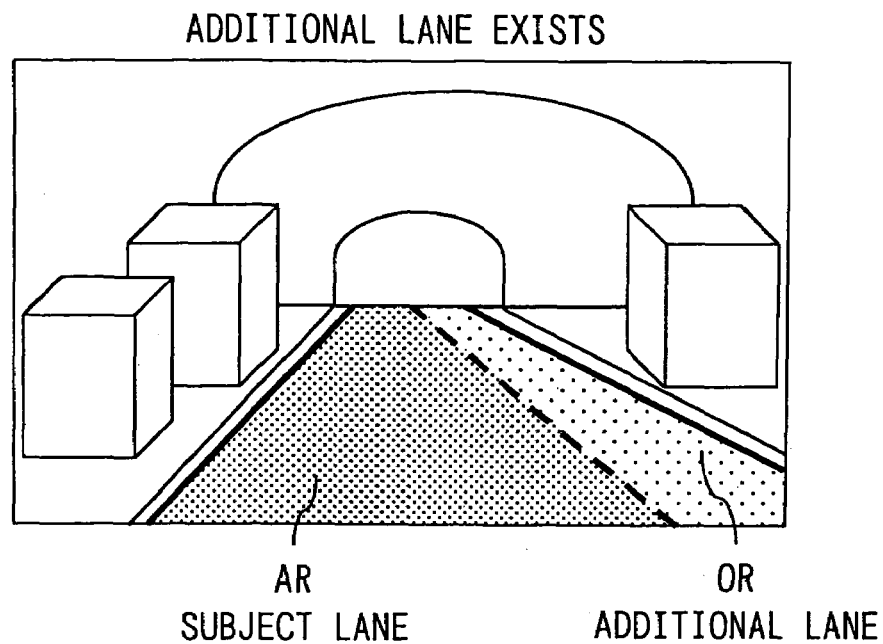
FIG. 3A is an example of an image of a road and surroundings including an additional lane.
Figure 3B:
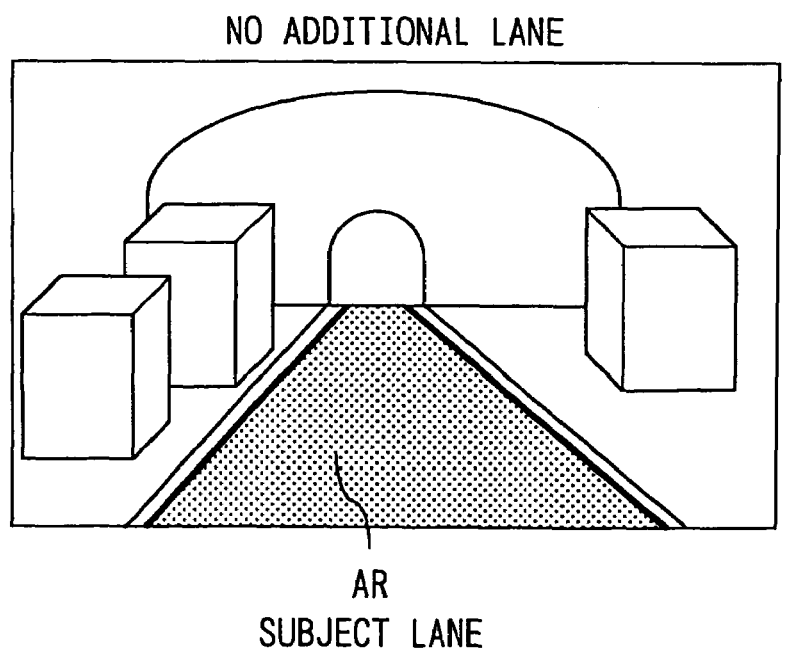
FIG. 3B is an example of an image of a road and surroundings not including an additional lane.

The camera 20 is, for example, a video camera or the like, and it is used for capturing an image of a road in front of the subject vehicle as shown in FIGS. 3A and 3B. The camera 20 outputs the image to the controller 10 as a set of pixel data showing brightness of each pixel in the image.

The vehicle detector 30 is, for example, a millimetric radar, a laser radar or the like, and it is used for detecting another vehicle with an inter-vehicle distance, a relative velocity and a lateral displacement from the center of the subject vehicle width. The vehicle detector 30 outputs information about the other vehicle to the controller 10.

The controller 10 is, for example, a microcomputer and it includes components such as a ROM, a RAM, a CPU, an I/O and a bus for electrically connecting the components (not shown in the figure). The ROM stores a program that is executed in the CPU, and the CPU controls processes according to this program.

The controller 10 performs a subject lane detection function 12, an additional lane detection function 14, and a driving assistance function 16. The subject lane detection function 12 detects a white boundary line of a subject lane where the subject vehicle is traveling based on an image data from the camera 20. The subject lane detection function 12 outputs subject lane information derived from the white boundary line (for example, a lateral displacement from the center of the subject vehicle width) to the additional lane detection function 14 and the driving assistance function 16.

The additional lane detection function 14 detects an additional lane based on the subject lane information from the subject lane detection function 12 and the other vehicle information from the vehicle detector 30. The additional lane detection function 14 outputs the information on the detected lanes to the driving assistance function 16.

The driving assistance function 16 uses the information from the additional lane detection function 14 to choose a driving assistance mode from the predetermined set of driving assistance modes and executes a process for driving assistance based on the chosen mode. That is, the driving assistance function 16 selects the driving assistance mode based on a condition if an additional lane exists around the subject lane or surrounding of the subject vehicle. This is because safety of the subject vehicle is affected by the condition of the additional lane or the like.

For example, driving assistance for staying in a subject lane by controlling a steering torque selects different levels of steering torque for a condition that an additional lane OR exists next to the subject lane AR, as shown in FIG. 3A, and for a condition that no additional lane exists, as shown in FIG. 3B, because a degree of risk is different for each of the conditions. More practically, the degree of risk differs whether the subject lane AR lies adjacent to a railing or a passing lane.

Driving assistance for keeping a certain distance to a preceding vehicle, for another example, changes an inter-vehicle distance to the preceding vehicle depending on how much room is reserved for a vehicle coming in from other lanes.

Figure 2:
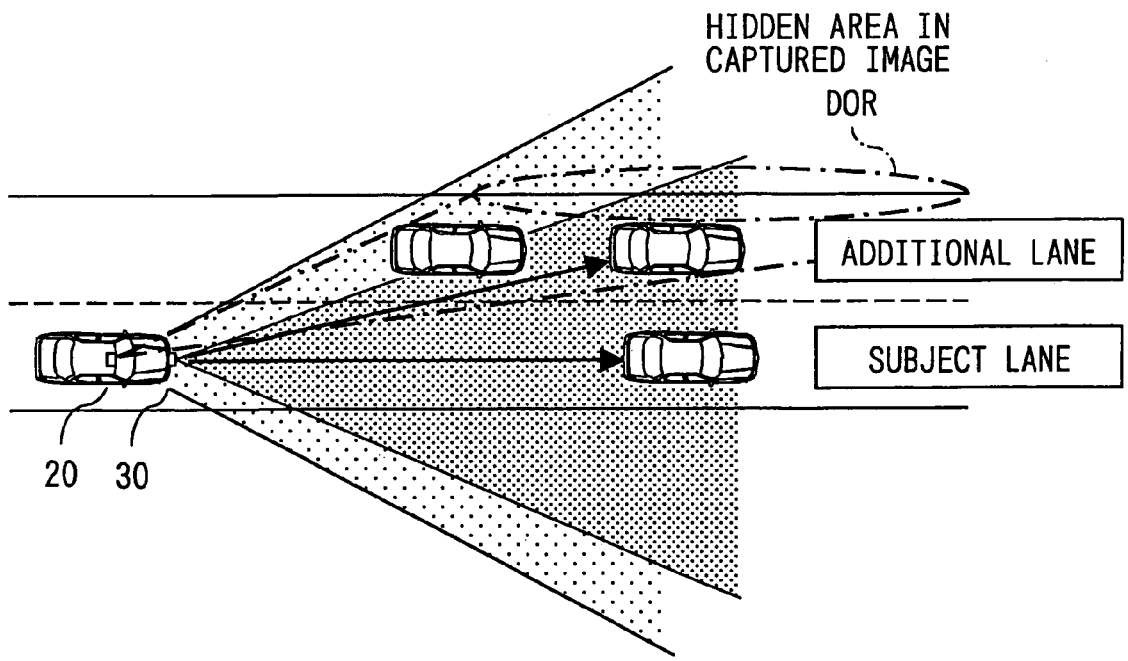
FIG. 2 is a top view of an area (DOR) that cannot be captured in an image captured by a camera.

Therefore, the driving assistance mode has to be chosen depending on the condition of the additional lane, if it exists, next to the subject lane. However, as the conventional device detects the additional lane only from the image captured by the camera 20, it cannot identify the additional lane correctly when another vehicle hides the white boundary line of the additional lane in a situation such as that shown in FIG. 2. That is, if there is an area (DOR) that is not captured by the camera 20, the additional lane is not detected and the driving assistance described above can be unsafe.

In addition, the camera 20 can capture an image of the additional lane, but cannot capture a traveling direction of the additional lane. That is, traveling direction of the additional lane may be opposite to the subject lane or may be the same as the subject lane.

The lane detection apparatus 100 in the first embodiment detects the subject lane based on a positional relationship between the other vehicle detected by the vehicle detector 30 and the subject lane detected in the image captured by the camera 20. Further, the device 100 determines a traveling direction of the additional lane when the additional lane is detected.

The lane detection apparatus 100 performs an additional lane detection process as its characteristic function. The process is described with reference to a flowchart shown in FIG. 4. In step S10, a preceding vehicle in front of the subject vehicle is detected based on the other vehicle information from the vehicle detector 30. When the preceding vehicle is detected in this step, the process proceeds to step S20, and when no preceding vehicle is detected, the process proceeds to step S30.

In step S20, whether the preceding vehicle is only in the subject lane is determined based on the subject lane information from the subject lane detection function 12. When the result of step S20 is Yes, the process proceeds to step S30. When the result of step S20 is No, the process proceeds to step S40.

Step S30 is performed when the preceding vehicle is only in the same lane as the subject vehicle or when preceding vehicle does not exist. On these conditions, the additional lane is detected simply in the captured image in the conventional manner because the white boundary line of the traveling lane can be easily recognized.

Figure 5:
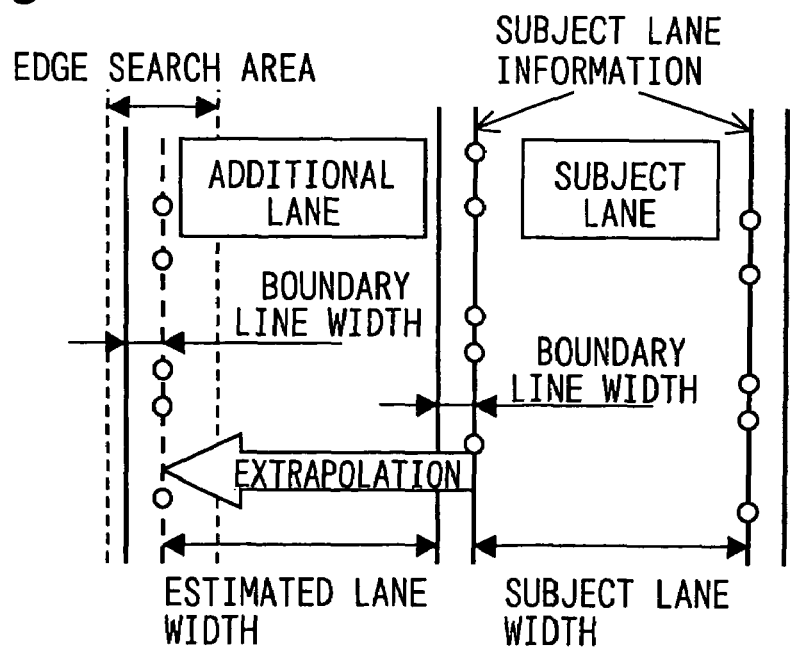
FIG. 5 is a top view that illustrates additional lane detection based on the captured image.

In step S30, the process assumes, as shown in FIG. 5, that the subject lane and the additional lane have the same width (an estimated lane width). Then, the process sets an edge search area in order to detect a far-side white boundary line as an edge of pixels. The pixels are determined as an edge, i.e., a boundary line, when the difference of pixel brightness is equal to or greater than a predetermined value based on the difference of brightness of pixels in an image including a road surface and white boundary lines.

When the process detects a predetermined number of edges, e.g., two edges or more, as white boundary lines, it determines that there is the additional lane. In this manner, the additional lane is detected when there is no preceding vehicle or when the preceding vehicle is only in the same lane as the subject vehicle, i.e., in the subject lane.

In step S40, the process determines whether there is the additional lane when the other preceding vehicle is not in the same lane as the subject vehicle. In this step, an additional lane flag is set as 'ON.'

In step S50, the type of the additional lane is detected. In this step, a change in distance to the other vehicle and/or a relative velocity of the other vehicle are detected for the lane type detection.

For example, when the distance from the subject vehicle to the other vehicle is decreasing and the relative velocity is less than the subject vehicle's velocity, the other vehicle's lane is determined to be a passing lane or the like having the same traveling direction as the subject lane. That is based on the assumption that the subject vehicle is catching up to the other vehicle that is traveling slower than the subject vehicle.

Further, when the distance from the subject vehicle to the other vehicle is decreasing and the relative velocity is more than the subject vehicle's velocity, the other vehicle's lane is determined to be an opposite lane. That is based on the assumption that the other vehicle is oncoming to the subject vehicle.

Furthermore, when the distance from the subject vehicle to the other vehicle is increasing, the other vehicle's lane is determined to be the passing lane or the like having the same traveling direction as the subject lane. That is based on the assumption that the other vehicle is traveling faster than the subject vehicle and moving away from the subject vehicle. In this manner, the traveling direction of the additional lane is determined based on the distance to the other vehicle and/or the relative velocity of the other vehicle with respect to the subject vehicle.

The lane detection apparatus 100, as described above, detects the additional lane based on the positional relationship between the other vehicle detected by the vehicle detector 30 and the subject lane detected in the image captured by the camera 20. As a result, the additional lanes including an adjacent lane are detected without recognizing the white boundary line between the lanes.

Figure 4:
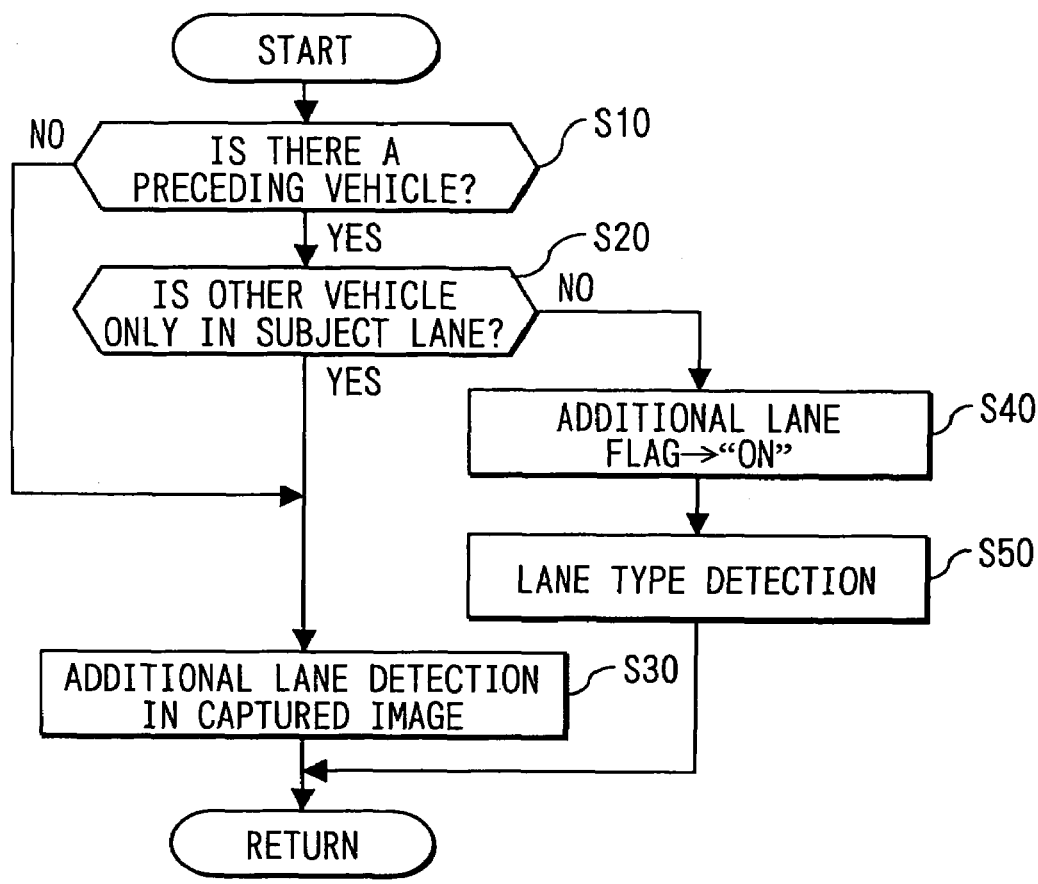
FIG. 4 is a flowchart of an additional lane detection process according to the first embodiment.

In a second embodiment of the present invention, as shown in FIG. 4, the additional lane is solely detected by using the captured image when there is no preceding vehicle or when the preceding vehicle is only in the same lane as the subject vehicle. In this case, the apparatus detects the boundary line of the additional lane in the image first and, when the boundary line is not detected (or cannot be detected), then the process proceeds to the additional lane detection based on the positional relationship between the other vehicle and the subject lane.

Figure 6:
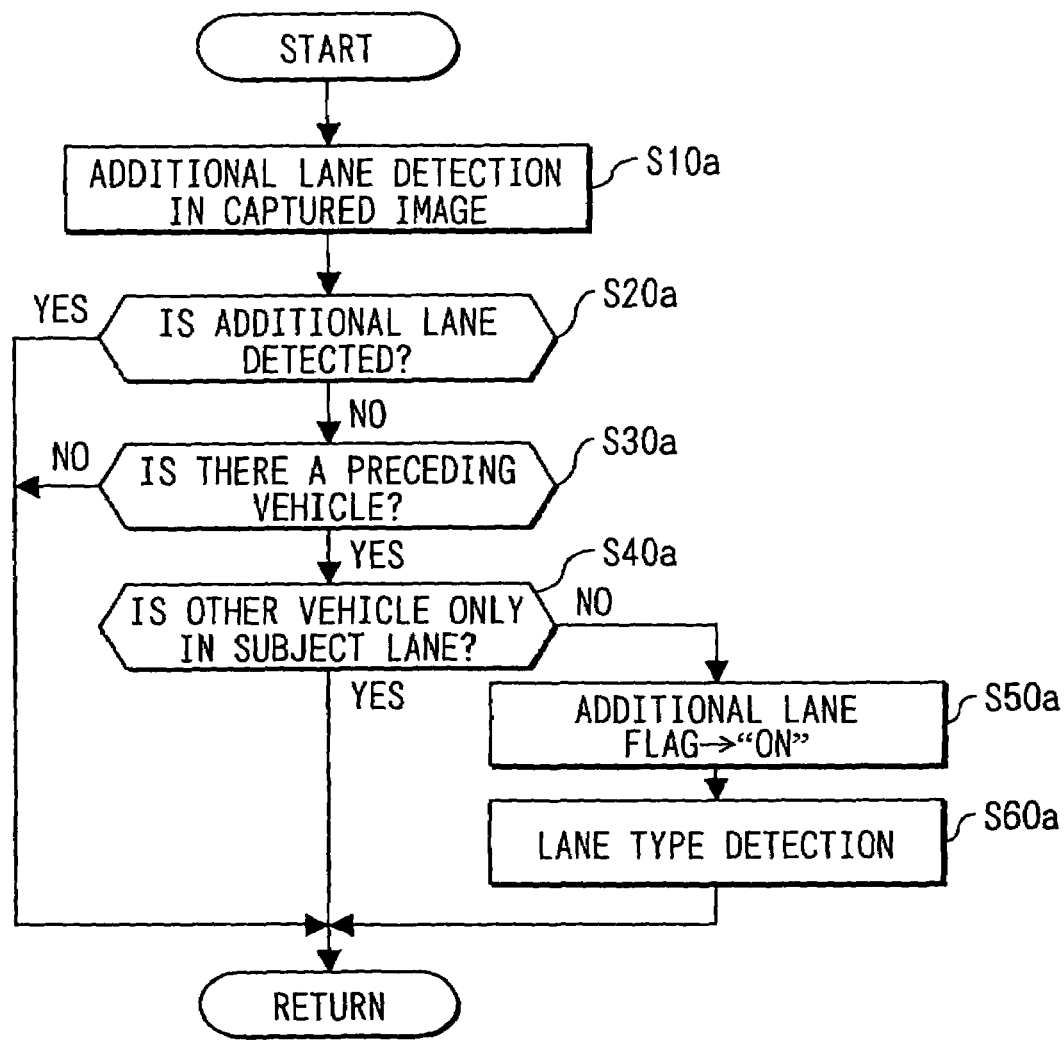
FIG. 6 is a flowchart of an additional lane detection process according to a second embodiment.

The additional lane detection process performed by the lane detection apparatus 100 in this embodiment is described with reference to a flowchart shown in FIG. 6. In step S10a, the same process as step S30 is performed. In step S20a, whether the additional lane detection is detected or not is determined.

That is, whether a predetermined number of edges, for example two edges or more, are detected is determined. When the predetermined number of edges are detected, the additional lane detection process proceeds to an end based on the assumption that the white boundary line of the additional lane is detected. When the edges are not detected, the process proceeds to step S30a.

In step S30a, whether the preceding vehicle exists in front of the subject vehicle is determined based on the other vehicle information from the vehicle detector 30. When the preceding vehicle is detected, the process proceeds to step S40a, and when there is no preceding vehicle, the detection process proceeds to the end as no additional lane can be detected.

In step S40a, the same process as step S20 is performed. That is, whether the other vehicle is only in the same lane as the subject vehicle is determined based on the subject lane information from the subject lane detection function 12. When the result of step S40a is Yes, the detection process proceeds to the end as no additional lane can be detected. When the result of step S40a is No, the process proceeds to step S50a.

In steps S50a and S60a, the same processes as steps S40 and S50 are performed and, therefore, description of steps S50a and S60a is omitted. As a result, the additional lane detection process in this embodiment first detects the boundary line of the additional lane in the image and when the additional lane is not detected as the boundary line, the process detects the additional lane based on the positional relationship of the other vehicle and the subject lane.

What is claimed is:

1. A lane detection apparatus comprising:
a capture means for capturing an image around a subject vehicle;
a vehicle detection means for detecting an object vehicle around the subject vehicle;
a subject lane detection means for detecting a subject lane where the subject vehicle is traveling based on the image captured by the capture means; and
an additional lane detection means for detecting an additional lane different from the subject lane based on a positional relationship between the object vehicle detected by the vehicle detection means and the subject lane detected by the subject lane detection means,
wherein the vehicle detection means detects a distance to the object vehicle, a velocity of the subject vehicle and a relative velocity of the object vehicle relative to the subject vehicle,
wherein the additional lane detection means detects a traveling direction of the additional lane based on at least one of a change in distance to the object vehicle and the relative velocity of the object vehicle,
wherein the additional lane detection means determines that the traveling direction of the object vehicle in the additional lane is the same as the traveling direction of the subject vehicle when the distance to the object vehicle is decreasing and the relative velocity of the object vehicle is smaller than the velocity of the subject vehicle,
wherein the additional lane detection means determines that the traveling direction of the object vehicle in the additional lane is opposite to traveling direction of the subject vehicle when the distance to the object vehicle is decreasing and the relative velocity of the object vehicle is greater than the velocity of the subject vehicle, and
wherein the additional lane detection means determines that the traveling direction of the object vehicle in the additional lane is the same as the traveling direction of the subject vehicle when the distance to the object vehicle is increasing.

2. The lane detection apparatus of claim 1, further comprising:
a search area setting means for specifying a search area of a boundary line of the additional lane based on a lane width of the subject lane; and a boundary line detection means for detecting the boundary line in the search area specified by the search area setting means,
wherein the additional lane detection means detects the additional lane when the boundary line detection means does not detect the boundary line.

3. The lane detection apparatus of claim 1,
wherein the additional lane detection means detects the additional lane when
the object vehicle is detected by the vehicle detection means and the object vehicle is not in the subject lane.

4. The lane detection apparatus of claim 1,
wherein the subject vehicle is under at least one of two circumstances that the object vehicle is not detected by the vehicle detection means and that the object vehicle is detected only in the same lane as the subject lane,
wherein the lane detection apparatus employs a search area setting means for specifying a search area of a boundary line of the additional lane based on a lane width of the subject lane and a boundary line detection means for detecting the boundary line in the search area specified by the search area setting means, and
wherein the additional lane detection means detects the additional lane when the boundary line detection means detects the boundary line of the additional lane.

* * * * *